July 17, 1962  W. D. CHAMBERS  3,044,736
LIQUID COOLED FRICTION BRAKES
Filed Oct. 5, 1959  6 Sheets-Sheet 1

FIG.1

INVENTOR.
WARREN D. CHAMBERS
BY
Gordon H. Chenez
AGENT

July 17, 1962  W. D. CHAMBERS  3,044,736
LIQUID COOLED FRICTION BRAKES
Filed Oct. 5, 1959  6 Sheets-Sheet 2

INVENTOR.
WARREN D. CHAMBERS
BY
Gordon H. Cheney
AGENT

July 17, 1962 W. D. CHAMBERS 3,044,736
LIQUID COOLED FRICTION BRAKES
Filed Oct. 5, 1959 6 Sheets-Sheet 3

FIG.3

INVENTOR.
WARREN D. CHAMBERS
BY
Marlow N. Chavez
AGENT

FIG.4

INVENTOR.
WARREN D. CHAMBERS

United States Patent Office 3,044,736
Patented July 17, 1962

3,044,736
LIQUID COOLED FRICTION BRAKES
Warren D. Chambers, South Bend, Ind., assignor to The Bendix Corporation, a corporation of Delaware
Filed Oct. 5, 1959, Ser. No. 844,523
8 Claims. (Cl. 244—111)

This invention relates in general to cooling apparatus for friction brakes and, in particular, to cooling apparatus for aircraft disk brakes which utilizes the principle of liquid cooling to dissipate the heat generated during braking.

The need for faster dissipation of energy in the braking system of modern high performance aircraft has accentuated the inability of existing aircraft wheel and brake materials to cope with the high temperatures encountered as a result of braking during taxi and landing operation of the aircraft. The great weight and high landing speeds of the aircraft dictate a wheel and brake of extremely large capacity while the space available for storing the wheel and brake when retracted in the aircraft restricts the wheel and brake to relatively small dimensions. Consequently, the heat developed by the friction elements of the brake must be rapidly and efficiently dissipated from the wheel and brake by employing some type of cooling medium such as liquid or air which is circulated through the brake and through either the heat of vaporization and/or conduction of the liquid or conduction by the air, the heat is carried away from the brake to maintain the operating temperature of the brake below an acceptable limit. Also, the high flight speed of some present day high performance aircraft creates a problem in that the surface temperature of the aircraft may reach a relatively high value by virtue of frictional resistance of the air passing over the aircraft which, in turn, creates correspondingly high temperatures in compartments such as that allocated for a retractible landing gear. Thus, the wheel and brake structure may be heated initially to such a degree that a maximum allowable operating temperature is reached rather quickly during a subsequent braking operation unless an adequate brake cooling medium is provided. Various forms of liquid and/or air cooling systems for brakes have been proposed which for the most part are not entirely satisfactory due to a relatively small capacity for heat dissipation, bulkiness and/or excessive weight and complexity.

It is, therefore, an object of this invention to provide simply constructed and effective liquid cooling apparatus for friction brakes.

It is another object of this invention to provide a liquid cooling system for friction brakes which utilizes the heat of vaporization of a liquid to rapidly and efficiently dissipate the heat generated by the brake during the braking process.

It is still another object of this invention to provide a liquid cooling system for friction brakes which has a large heat dissipating capacity.

It is an important object of this invention to provide a liquid cooling system for friction brakes wherein the friction elements of the brake are cooled by a spray of liquid and/or by partial or total immersion of the friction elements in the liquid.

It is yet another object of this invention to provide a liquid cooling system for friction brakes wherein the friction elements of the brake are encased in a sealed container and immersed in liquid over the major portion thereof.

It is an important object of this invention to provide a liquid cooling system for friction brakes which is light in weight and which requires a relatively small space allocation.

Other objects and advantages of the present invention will become apparent from the following description taken in conjunction with the accompanying drawings wherein:

Figure 1:
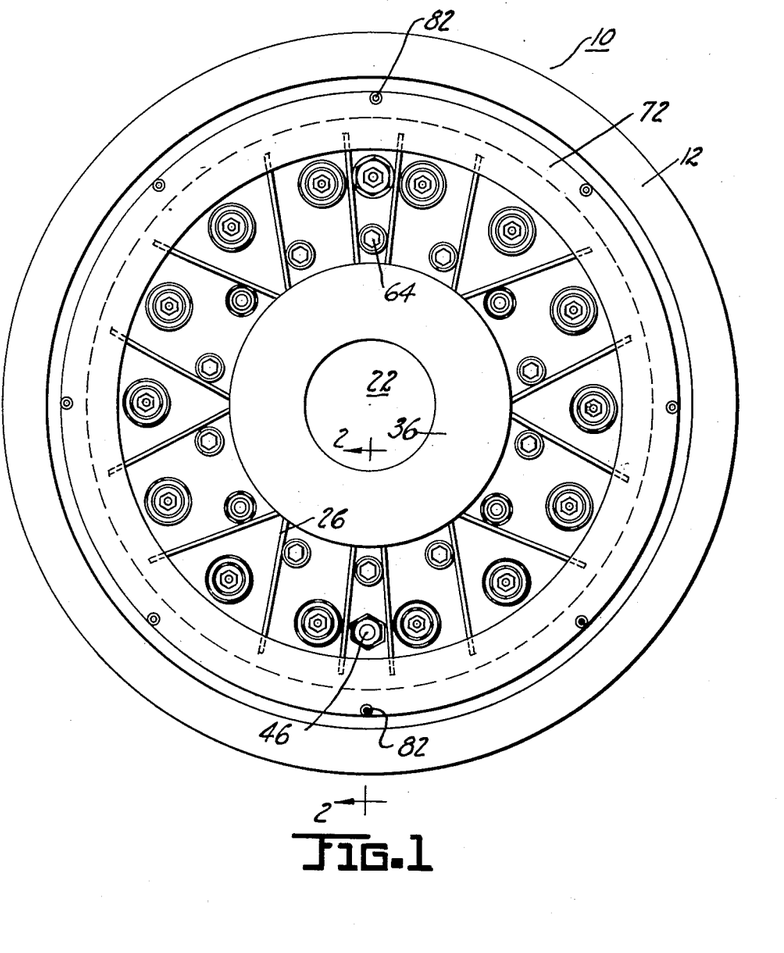
FIGURE 1 is a side view of an aircraft wheel and brake assembly embodying the present invention.
Figures 2, 8:
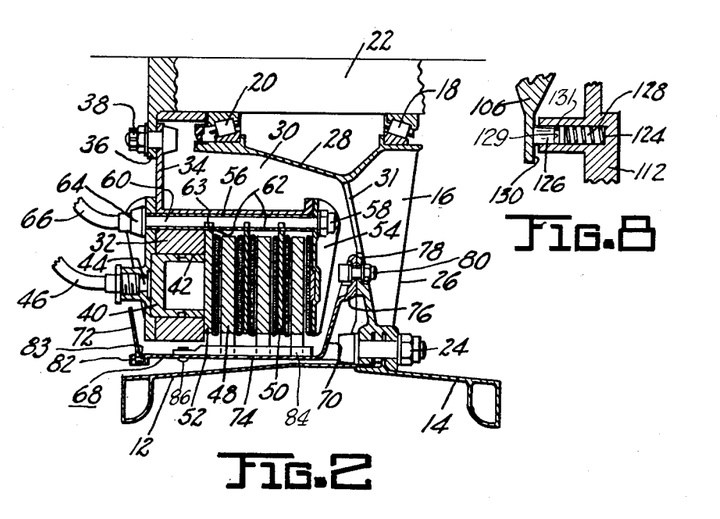
FIGURE 2 is a sectional view taken on line 2—2 of FIGURE 1 wherein only the lower half of the wheel and brake embodying the present invention is shown, the upper half being identical in structure to the lower half.
FIGURE 8 is an enlarged view showing in greater detail one of the sliding seals of FIGURE 5.

Referring to the drawings and in particular to FIGURES 1 and 2, numeral 10 designates a wheel and brake assembly comprising annular tire retaining rim halves 12 and 14 fixedly secured to the radially outer portion of an annular rim supporting member 16 which is rotatably mounted on a pair of spaced bearing members 18 and 20 carried by a wheel supporting axle 22. The rim halves 12 and 14 are secured to the rim supporting member 16 by a plurality of axialy extending, circumferentially arranged bolt and nut combinations 24. The rim supporting member 16 is formed with a radially outwardly extending side portion 26 and an axially extending tubular portion 28 which extend into engagement with the outer races of bearing members 18 and 20, respectively, and partially define a brake cavity 30. Circumferentially spaced openings 31 in the rim supporting member 16 are provided to allow air to circulate into the brake cavity 30.

An annular brake carrier member 32 is provided with a radially inwardly extending flange 34 which engages a radially outwardly extending flange 36 formed on the axle 22 and which is fixedly secured thereto by a plurality of circumferentially arranged bolt and nut combinations 38. A fluid actuated piston 40 slidably carried in a bore 42 formed in carrier member 32 is responsive to pressurized fluid communicated to bore 42 from a suitable source of fluid pressure, not shown, via a passage 44 formed in carrier member 32 and conduit 46. A plurality of axially aligned interleaved rotors and stators 48 and 50, respectively, are arranged in a conventional manner between an axially movable pressure plate 52 which is actuated axially by the piston 40 and a fixed reaction plate 54 which is fixedly secured to the carrier member 32 by a plurality of axially extending circumferentially positioned hollow stator keys 56 and nuts 58 threadedly engaged with the keys 56. The stators are splined to stator keys 56 which are provided with an axial bore 60 and a plurality of transverse bores 62. A coupling 64 secured to one end of the keys 56 connects bore 60 with a conduit 66 leading to a source of pressurized liquid coolant, not shown. Pressurized liquid coolant, for example, water, is forced into bore 60 from which it flows through transverse bores 62 to the rotors and stators in the form of a spray. Reference is made to application No. 577,807, filed April 12, 1956, in the name of Albert H. Osborne entitled "A System For Cooling Kinetic-Energy-Absorbing Devices" (common assignee) now Patent No. 2,958,399 for a detailed description of the structure and operation of one such type of liquid coolant supply system. The transverse bores 62 are provided with orifices 63 which control the spray pattern of the liquid coolant as desired. During the braking process, suitable control apparatus, either manual operated or automatically operated in response to a predetermined condition of operation of the brake, is positioned to allow pressurized liquid coolant to flow to the bore 60 from which it is sprayed against the inner periphery of the rotors and stators. The heated rotors and stators are cooled by the coolant which absorbs heat therefrom as it flows between adjacent surfaces of the rotors and stators. From the outer diameter of the rotors and stators the coolant passes to the atmosphere in the form of vapor or droplets. While the sprayed coolant acts to carry away a significant amount of heat from the heated brake, a full utilization of the heat absorbing quality of the coolant is not realized since it passes through the brake in a relatively short time and is then lost to the atmosphere. Since the amount of heat transfer between the coolant and the heated rotors and stators varies as a function of time, the effectiveness of the cooling process can be greatly increased by immersing a portion of or the entire surfaces of the rotors and stators in the coolant.

To this end, the present invention proposes an annular trough shaped member 68 comprising radially inwardly extending sides 70 and 72 joined by an intermediate rim portion 74. The member 68 is fixed to the supporting member 16 by means of flanges 76 and 78 formed on side 70 and supporting member 16, respectively, which are secured together by a plurality of bolt and nut combinations 80. The side 72 is fixed to the intermediate rim portion 74 by a plurality of screw members 82 threadedly engaged with the intermediate portion 74. A suitable seal 83, for example, an O ring, is inserted between adjacent cooperating surfaces of side 72 and intermediate rim portion 74 to establish a fluid seal between. It will be noted that the side 72 may be removed to facilitate assembly of the various components of the wheel and brake. The trough shaped member 68 serves to trap the liquid coolant which is thrown radially outward from the rotors 48. Centrifugal force prevents the coolant from flowing out of the trough shaped member 68 until the level of the coolant reaches the radial inner edge of the side 72. It will be understood that the maximum level of coolant may be adjusted to suit requirements by varying the radial dimension of the side 72 as desired. By trapping the liquid coolant in the trough shaped member 68 the brake is immersed to a predetermined depth in the coolant whereupon the effectiveness of the heat transfer process is increased by virtue of the heated brake being continuously bathed in coolant. In this manner, the frictional heat generated by the brake is effectively dissipated to maintain the temperature of the brake below a prescribed limit and also prevent damage to the wheel and tire mounted thereon from the brake heat. Of course, when the wheel and thus the trough shaped member 68 comes to rest the coolant in the member 68 flows over the upper edge of the lowest portion of the side 72 upon the ground.

The rotors 48 are splined at their outer edges to keys 84 which are fixed to the intermediate rim portion by fastening members 86.

Figure 3:
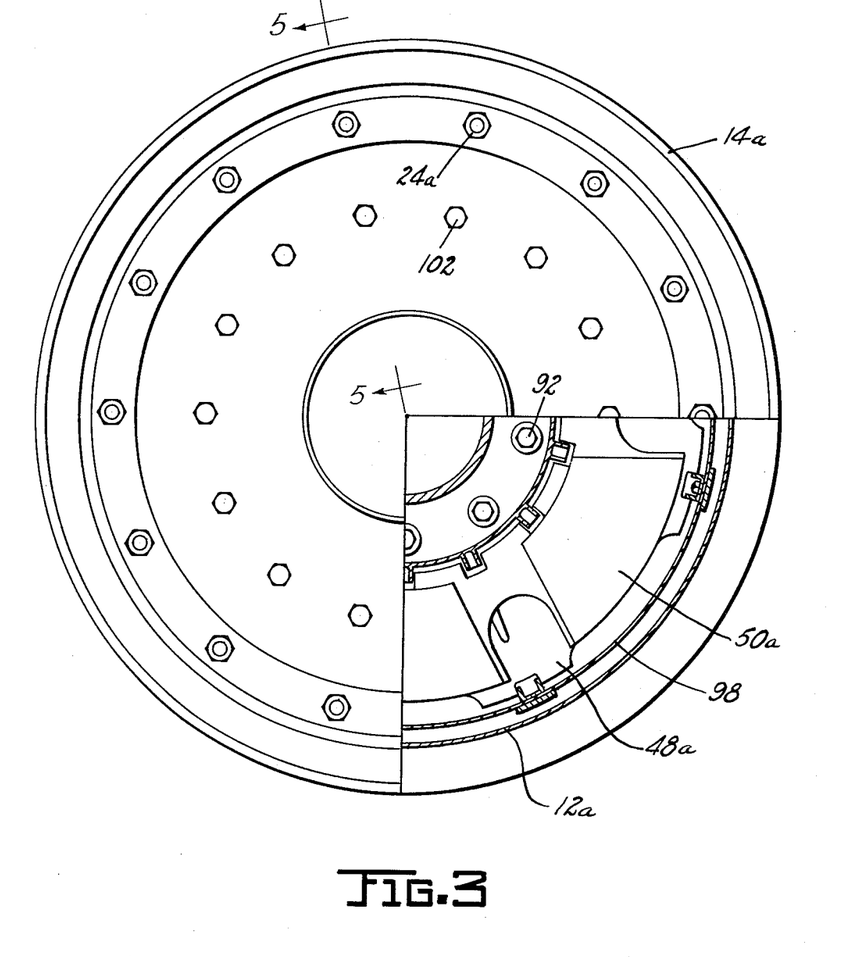
FIGURE 3 is a side elevation partly in section of an aircraft wheel and brake embodying a first modification of the present invention.
Figure 4:
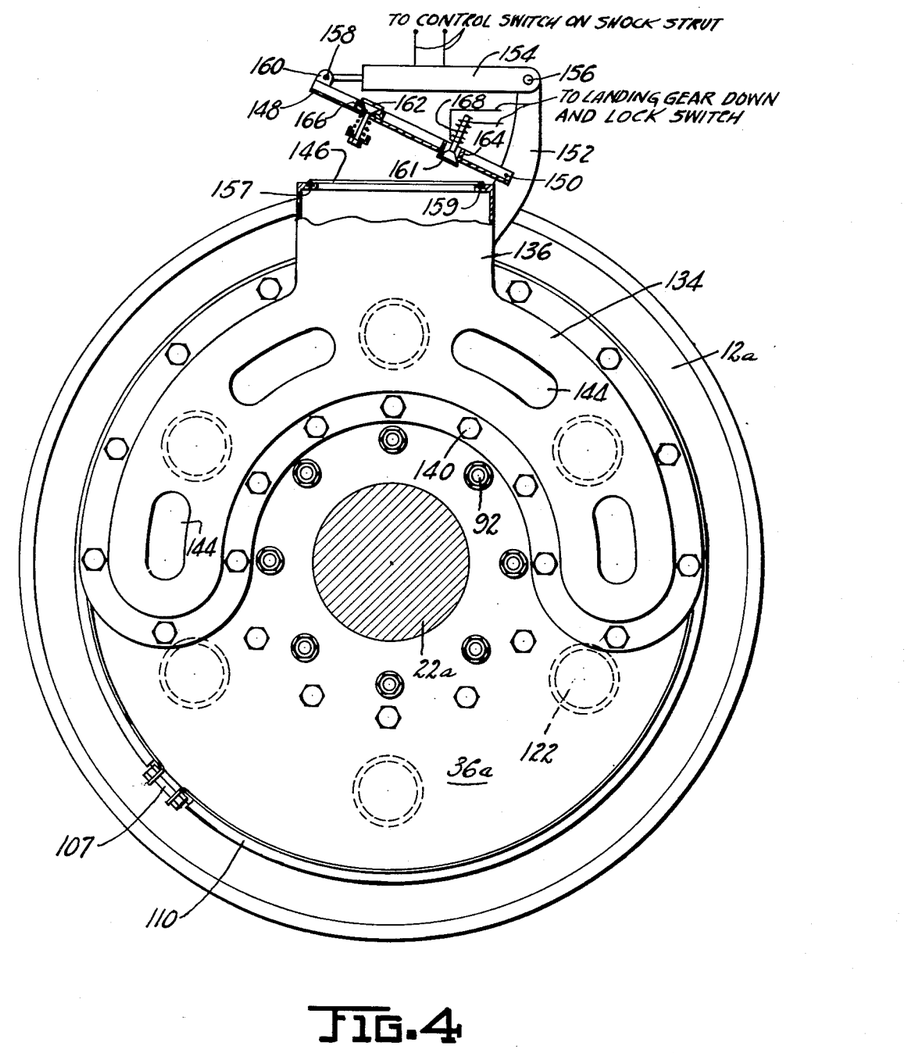
FIGURE 4 is a side view of the opposite side of the aircraft wheel and brake of FIGURE 3.
Figure 5:
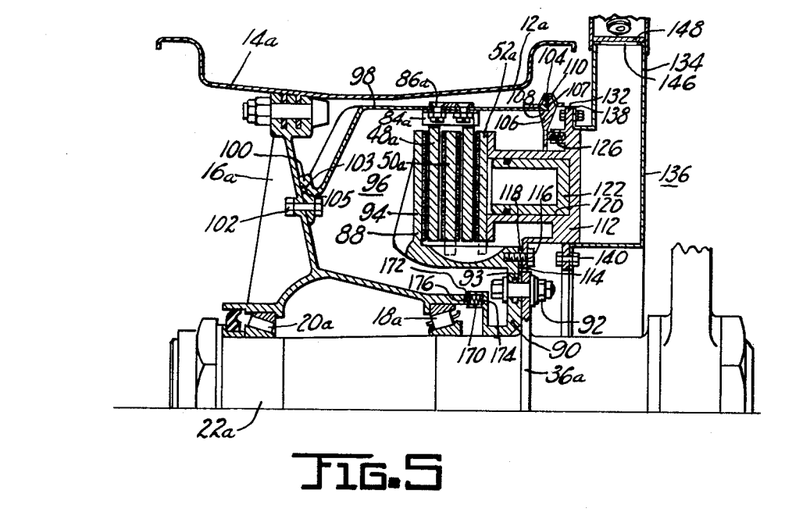
FIGURE 5 is a sectional view taken on section line 5—5 of FIGURE 3 showing the upper half of the wheel and brake embodying the first modifications of the present invention, the lower half being identical in structure to the upper half.

Referring now to FIGURES 3, 4 and 5, a modified form of the present invention shown in which the entire brake is encompassed by a sealed container, a portion of which rotates with the wheel. Parts shown in FIGURES 3, 4 and 5 which correspond to structure shown in FIGURES 1 and 2 are numbered accordingly with the addition of subscript a.

The numerals 12a and 14a designate tire retaining rim halves clamped to the rim supporting member 16a. the rim supporting member 16a is rotatably mounted on bearing members 18 and 20a carried by the wheel supporting axle 22a. The rim supporting member 16a is identical to that shown in FIGURES 1 and 2 with the exception of being solid in cross section i.e., without the openings 31 shown in FIGURE 2 for a purpose to be explained hereinafter.

An annular brake carried member 88 is provided with a radially inwardly extending flange 90 which abuts flange 36a formed on axle 22a and is fixedly secured thereto by a plurality of bolt and nut combinations 92. An O ring seal 93 suitably disposed in carrier member 88 serves as a fluid seal between adjacent cooperating surfaces of the bolt and carrier member 88. A reaction member 94 formed integral with the brake carrier member 88 extends into a brake cavity 96 partially defined by an annular plate 98 having a flange 100 formed thereon which abuts supporting member 16a and which is fixedly secured thereto by a plurality of circumferentially spaced bolt and nut combinations 102. A recess 103 formed in flange 100 is provided with an O ring 105 which seals adjacent cooperating surfaces of the flange 100 and supporting member 16a. The free end of the annular plate 98 is provided with a flange 104 against which an annular ring 106 having flanged portions 107 and 108 is secured. An annular clamping ring 110 is fitted over flanges 104 and 106 and locked in position thereon by a screw mechanism 107 to thereby fixedly secure the ring 106 to the annular plate 98. An annular housing 112 having a radially inwardly extending flange 114 is fixedly secured to the carrier member 88 by a plurality of circumferentially spaced fastening members 116 threadedly engaged with carrier member 88. An annular gasket or seal 118 is compressed between flange 114 and carrier member 88 and provides a fluid seal therebetween. A plurality of circumferentially spaced bores 120 formed in housing 112 are provided with fluid actuated pistons 122 which respond to pressurized fluid conducted to bore 120 from a suitable source, not shown. The housing 112 is provided with recess 124 which receives a sliding seal such as an annular carbon ring seal 126 backed by a spring 128 which urges the carbon ring 126 into contact with a bearing surface 130 formed on annular ring 106 to thereby establish a sliding fluid seal between the fixed housing 112 and the rotatable ring 106. An annular recess 129 formed in carbon ring seal 126 is provided with an O ring seal 131 which seals adjacent cooperating surfaces of the ring seal 126 and the wall of recess 129 as illustrated in FIGURE 8 where carbon ring seal 126 is shown in greater detail. Interleaved rotors and stators 48a and 50a, respectively, are arranged between the fixed reaction member 94 and axially movable pressure plate 52a, the latter member being actuated by piston 122 to frictionally compress the rotors and stators 48 and 50. The rotors 48a are splined at their outer edges for axial movement to keys 84a which are fixedly secured to annular plate 98 by a plurality of fastening members 86a. The stators 50a are splined to carrier member 88 for axial but not rotatable movement.

The upper half section of annular housing 112 is provided with a circumferentially extending flange 132 to which is secured a vapor collecting semi-circular housing 134 which is vented to the atmosphere through a standpipe 136 formed on the uppermost surface of the housing 134. The housing 134 is provided with a flange 138 which is fixedly secured to flange 132 by means of a plurality of spaced fastening members 140. The interior of the housing 134 communicates with the brake cavity 96 via a plurality of circumferentially spaced openings 144 formed in housing 112 between the spaced bores 120. Opening 146 of standpipe 136 is controlled by a gate 148 pivotally secured by pin 150 to a bracket 152 fixedly secured to the outer surfaces of the standpipe 136. A hydraulically or electrically operated actuator mechanism 154 which is of conventional design and operation is pivotally connected at one end by a pin 156 to the bracket 152 and at the opposite end is pivotally connected by a pin 158 to a lug 160 on gate 148. The actuator mechanism 154 is energized from a suitable source of power, not shown, to cause opening movement of gate 148 in response to the triggering of a control switch, not shown, operatively connected to the aircraft landing gear and responsive to shock strut compression following landing of the aircraft. When the shock strut is extended as is the case when the aircraft is airborne, the actuator mechanism 154 is energized in an opposite manner to an extended position whereby the gate 148 is closed. An O ring 157 disposed in a recess 159 formed in standpipe 136 serves to seal adjacent cooperating surfaces of the standpipe 136 and gate 148. Vent valves 161 and 162 are arranged in openings 164 and 166, respectively, formed in gate 148 and serve to vent the interior of housing 134 to the atmosphere under certain conditions of operation when the gate 148 is closed as will be explained more fully in the operational discussion which follows. The vent valve 161 is connected to and actuated by an electrical solenoid 168 which is energized from a suitable source of power, not shown, in response to the triggering of a landing gear down lock switch, not shown, operatively connected to the landing gear. The vent valve 162 is a conventional spring loaded check valve which opens in response to a predetermined maximum allowable pressure in housing 134 to thereby avoid exceeding structural limits of the housing 134.

An annular recess 170 formed on a radially outwardly extending portion of flange 90 is provided with a sliding seal such as an annular carbon ring seal 172 backed by a spring 174 which spring urges the carbon ring into engagement with a bearing surface 176 formed on axially extending flanged portion 28a of rim supporting member 16a. The carbon ring seal 172 acts as a sliding fluid seal between the rotatable flanged portion 28a and the fixed carrier member 88. An annular recess 175 may be formed in the carbon ring seal 172 and provided with an O ring seal in a manner similar to that provided for carbon ring seal 126 illustrated in FIGURE 8. Thus, it will be noted that the brake cavity 96 constitutes a sealed volume within which the entire brake is disposed.

Prior to aircraft take-off, the brake cavity 96 is filled to capacity with liquid coolant from a suitable ground based source, not shown, via the opening 146 in standpipe 136. The gate 148 is held in the open position as shown in FIGURE 5 in response to the landing gear shock strut compression caused by the weight of the aircraft. With the brake cavity 96 filled to capacity it will be noted that the brake rotors and stators, 48a or 50a, are surrounded by liquid coolant which during subsequent taxiing and landing operation of the aircraft serves to absorb heat generated by frictional engagement of the rotors and stators 48a and 50a during application of the brake. The annular plate 98 rotates with the wheel rim supporting member 16a and rotors 48a and prevents the liquid coolant which is urged radially outward by centrifugal force from flowing out of the brake cavity 96. During repeated hard applications of the brake, the heat absorbed by the liquid coolant may be sufficient to cause vaporization of a portion of the coolant in which case the vaporized coolant, being less dense than the liquid coolant, is displaced radially inwardly toward the center portion of the brake cavity 96 from which it flows through openings 144 into the housing 134 thence through standpipe 136 and opening 146 to the atmosphere.

Assuming the aircraft to be taking off, the aircraft will become airborne causing the landing gear shock strut, not shown, to move to its extended or protracted position and actuate the aforementioned control switch, not shown, whereupon the actuator mechanism 154 is energized to an extended position which, in turn, closes the gate 148 thus sealing the opening 146. With the opening 146 sealed the landing gear may be retracted in the customary manner with no loss of the liquid coolant from the brake cavity 96 when the wheel is stowed in a horizontal position.

In the case of high performance aircraft which fly at speeds in excess of Mach 3, for example, it will be readily understood that there exists the problem of high ambient temperature in the compartment where the aircraft landing gear is stowed when retracted. For example, the temperature created by the frictional effect of the air passing over the exposed outer surface of the aircraft may very easily create a relatively constant compartment temperature of 350° F. to 400° F. to which the wheel and brake apparatus is exposed for a considerable length of time causing the wheel and brake apparatus to reach a correspondingly high temperature. In such a case, it will be readily appreciated that the liquid coolant in the brake cavity 96 may become partially vaporized creating a pressure on the order of 180 p.s.i. or more in the brake cavity 96. Assuming these conditions of temperature and pressure to exist just prior to landing the following sequence of operation will occur as the landing gear is lowered into extended position. Upon being lowered to the extended position, the landing gear will actuate the aforementioned landing gear down lock switch, not shown, which causes the electrically operated solenoid 168 to be energized which, in turn, actuates the vent valve 161 to an open position. The high pressure within the brake cavity 96 is vented through the opening 164 to the atmosphere at a relatively slow rate to avoid a sudden release of pressure which would effect a violent boiling of the liquid coolant and significant loss of coolant due to overflow of the steam liquid mixture. Upon landing, the aircraft will compress the shock strut which in turn triggers the control switch, not shown, in the heretofore mentioned manner to cause energization of the actuator mechanism 154 and concomitant opening movement of gate 148. It will be understood that sufficient pressure has been released through vent valve 161 to reduce the pressure in brake cavity 96 to substantially atmospheric.

Of course, it is necessary to replenish the liquid coolant in brake cavity 96 from time to time as required from the aforementioned source to maintain an adequate level of coolant in the brake cavity 96. It is recognized that a source of coolant may be carried within the aircraft and connected to the brake cavity 96 through suitably arranged conduits but such an arrangement greatly increases the weight, bulkiness and complexity of the coolant system and, therefore, would not afford all of the advantages of the heretofore described arrangement. With nonflying vehicles where size, weight and/or complexity of the coolant system are of little concern, the present invention may be used advantageously with a source of coolant carried by the vehicle.

Figure 6:
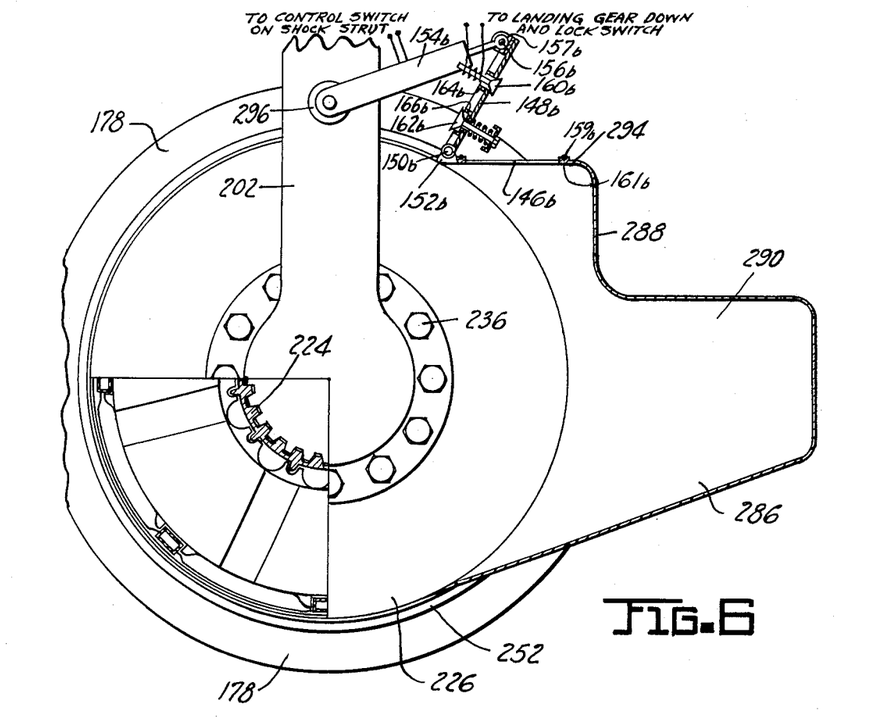
FIGURE 6 is a side view of an aircraft wheel and brake embodying a second modified version of the present invention.
Figure 7:
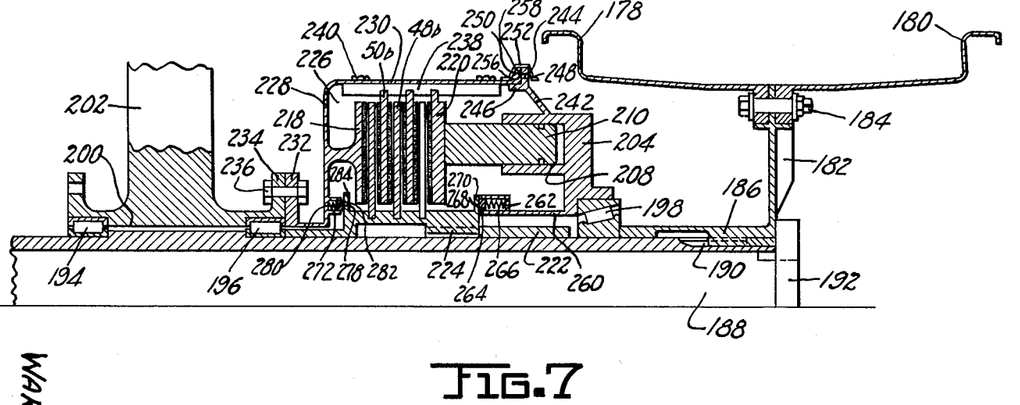
FIGURE 7 is a sectional view taken on line 7—7 of FIGURE 6 wherein only the upper half of the wheel and brake embodying the present invention is shown, the lower half being identical in structure to the upper half.

Referring now to FIGURES 6 and 7, a modified version of the present invention is shown in which the brake is encompassed by a sealed container, which is fixed to a nonrotatable part of the brake and does not rotate. It will be understood that the wheel and brake assembly shown in FIGURE 7 is one of two such wheel and brake assemblies, both of which are mounted on the same axle and separated by the landing gear strut. Since the structure of both wheel and brake assemblies is the same, the wheel and brake assembly shown and described may be duplicated to provide the dual wheel and brake arrangement. However, the wheel and brake assembly of FIGURES 6 and 7 is adaptable to use as a single wheel and brake arrangement in which case it would be within the skill of the art to modify the landing gear strut to accommodate only one wheel and brake assembly. Parts shown in FIGURES 6 and 7 which correspond to structure shown in FIGURES 1 and 2 are numbered accordingly with the addition of the subscript b.

The numerals 178 and 180 designate tire retaining rim halves which are fixedly secured to the radially outer portion of a rim supporting member 182 by a plurality of circumferentially spaced bolt and nut combinations 184. The rim supporting member 182 is provided with an axially extending tubular portion 186 which is attached to a hollow axle 188 by means of a spline connection 190. A plug 192 threadedly engaged with axle 188 serves to retain the rim supporting member 182 on axle 188. The hollow axle 188 is rotatably mounted in roller bearing assemblies 194, 196 and 198, the outer races of the bearings 194 and 196 being suitably mounted in a bore 200 formed in the lower end of a landing gear strut 202 and the outer race of bearing 198 being mounted in an annular housing 204. The annular housing 204 is provided with a plurality of circumferentially spaced bores 208 each of which receive a fluid actuated piston 210 which responds to pressurized fluid admitted to bores 208 from a suitable source, not shown. A plurality of interleaved axially movable rotors and stators 48b and 50b, respectively, are aligned axially between a fixed reaction member 218 and an axially movable pressure plate 220 and are pressed into frictional engagement by the pressure plate 220 which is actuated by piston 210. The rotors 48b are splined for axial movement to a tubular member 222 which is attached to the axle 188 by a splined connection 224. The stators 50b are splined for axial movement to a plurality of circumferentially spaced keys 238. The rotors and stators are encompassed by a fixed annular liquid coolant retaining drum 226 having a radially extending wall 228 and an axially extending rim 230. An annular flange 232 formed on drum 226 extends radially outward adjacent the wall 228 and abuts annular flange 234 formed on the lower end of the landing gear strut 202. The flanges 232 and 234 are clamped together by a plurality of circumferentially spaced bolt and nut combinations 236 which extend therethrough. It will be noted that the drum 226 constitutes a nonrotatable part of the wheel and brake assembly. The fixed reaction member 218 is shown formed integral with the drum 226 and is fixed, therefore, rotationally and axially. The stator keys 238 are fixedly secured to the rim 230 by a plurality of fastening members 240.

An annular rib 242 formed on housing 204 extends radially outwardly therefrom and is provided at its outer edge with an annular recess 244 formed by axially and radially extending flanges 246 and 248, respectively. The rim 230 is provided with an annular flange 250 which fits into recess 244. The flanges 248 and 250 are clamped together by a clamping ring 252 which overlaps the flanges 246 and 248 and which is tightened by a screw mechanism, not shown, similar to the screw mechanism 107 of FIGURE 4. An O ring 256 disposed in a recess 258 formed in flange 248 serves as a fluid seal between adjacent cooperating surfaces of the flanges 248 and 250. The housing 206 is provided with a tubular extension 260 which extends radially therefrom and which has an annular recess 262 formed in the end portion thereof. A sliding seal such as the carbon ring seal 264 backed by a spring 266 is arranged in the recess 262. The spring 266 urges the seal 264 outwardly from the recess 262 into sliding engagement with an annular bearing surface 268 formed on a radially outwardly extending flange 270 formed on tubular member 222 thereby providing a sliding fluid seal between the fixed housing 206 and the rotatable tubular member 222. An annular recess 272 formed in the radially extending wall 228 receives a sliding seal such as the carbon ring 278 backed by a spring 280. The spring 280 urges the seal 278 outwardly from the recess 272 into sliding engagement with an annular bearing surface 282 formed on a radially outwardly extending flange 284 formed on tubular member 222 thereby providing a sliding fluid seal between the fixed wall 228 and the rotatable tubular member 222.

Referring to FIGURE 6, the coolant retaining drum 226 is provided with an irregularly shaped extension 286 which provides additional volume for storing liquid coolant. The extension 286 is formed by a rim 288 which is an extension of rim 230 and sidewalls 290 and 292 only one of which is shown which are extensions of wall 228 and annular housing 206, respectively. A flat horizontally extending section 294 of rim 288 is provided with opening 146b. The opening 146b is controlled by gate 148b which is pivotally secured by pin 150b to bracket 152b. The gate 148b is controlled by hydraulically or electrically operated actuator mechanism 154b which is pivotally connected at one end by a pin 256b to the bracket 152b and at the opposite end is pivotally connected to a fixed support member 296 mounted on the strut 202. An O ring 157b disposed in a recess 159b formed in rim 288 serves to seal adjacent cooperating surfaces of the rim 228 and gate 148b. The actuator mechanism 154b is energized from a suitable source of power, not shown, to cause opening movement of gate 148b in response to the triggering of a control switch, not shown, operatively connected to the aircraft landing and responsive to shock strut compression following landing of the aircraft. Vent valves 160b and 162b are arranged in openings 164b and 166b, respectively, formed in gate 148b and are controlled in the manner set forth above in regard to FIGURE 5.

Prior to aircraft take-off, the brake cavity 96b is filled to capacity with liquid coolant from a ground based source, not shown, via the opening 146b. As in the case of the rotating container of FIGURES 4 and 5, the brake rotors and stators 48b and 50b are submerged in liquid coolant. The sequence of operation of the gate 148b is the same as that set forth above in regard to the rotating container of FIGURES 4 and 5. The basic difference between the rotating container of FIGURES 4 and 5 and the stationary container of FIGURES 6 and 7 is that the liquid coolant in the latter is not thrown radially outward by centrifugal force as is the case in the former. The liquid coolant vaporized by the frictional heat generated by the rotors and stators 48b and 50b rises to the surface of the liquid coolant and flows through opening 146b to the atmosphere.

Although the present invention has been described in conjunction with certain selected embodiments, it will be understood by those skilled in the art that numerous modifications and changes may be made of the structure shown without departing from the underlying principles of the invention. It is not essential that the present invention be used in conjunction with an aircraft disk brake for it is equally adaptable to use with other types of brakes, for example the shoe type.

I claim:

1. A liquid cooled friction brake for use with a member rotatably mounted on a fixed support member comprising a rotatable friction member operatively connected to and rotatable with said rotatable member; a nonrotatable friction member operatively connected to said fixed support member; actuating means operatively connected to one of said friction members for actuating the same into frictional engagement with the other of said friction members; a trough shaped annular housing fixedly secured to one of said rotatable and nonrotatable members, said annular housing having an axially extending rim spaced radially outwardly from said rotatable and nonrotatable friction members and side members fixedly secured to said rim and extending radially inwardly therefrom, said rotatable and nonrotatable friction members extending partially into the annular space defined by said rim and side members, said annular housing being operative to retain liquid coolant displaced radially outward by said rotatable friction member during rotation of the same whereby said rotatable and nonrotatable friction members are submerged in said liquid coolant to a predetermined depth depending upon the radial dimension of said side members.

2. A liquid cooled friction brake for use with a member rotatably mounted on a fixed support member comprising rotatable and nonrotatable friction members operatively connected to said rotatable and nonrotatable members, respectively; an annular fluid tight housing arranged radially outwardly from said rotatable and nonrotatable friction members and fixedly secured to and rotatable with said rotatable member; means operatively connected to said fixed support member for spraying liquid coolant radially outwardly against said rotatable and nonrotatable friction members during frictional engagement thereof; actuating means operatively connected to one of said rotatable and nonrotatable friction members for actuating the same into frictional engagement with the other friction member; and a source of liquid coolant connected to supply coolant to said spraying means, said coolant being displayed radially outwardly from said rotatable friction member into said annular housing by centrifugal force to thereby form a rotating annular body of liquid coolant, said rotatable and nonrotatable friction members extending radially outwardly into said annular body of coolant and being cooled thereby.

3. A liquid cooled friction brake for use with a member rotatably mounted on a fixed support member comprising rotatable and nonrotatable friction members operatively connected to said rotatable and fixed support members, respectively; actuating means operatively connected to one of said rotatable and nonrotatable members for actuating the same into frictional engagement with the other of said friction members; liquid coolant injecting means operatively connected to said fixed support member and arranged to inject liquid coolant radially outwardly against said rotatable and nonrotatable members; and an annular fluid tight housing fixedly secured to said rotatable member and rotatable therewith for retaining the coolant displaced radially outwardly from said rotatable member by centrifugal force.

4. A liquid cooled friction brake for use with a member rotatably mounted on a fixed support member comprising rotatable and nonrotatable friction members operatively connected to said rotatable and fixed support members, respectively; actuating means operatively connected to one of said rotatable and nonrotatable members for actuating the same into frictional engagement with the other of said friction members; liquid coolant injecting means operatively connected to said fixed support member and arranged to inject liquid coolant radially outwardly against said rotatable and nonrotatable members; and an annular fluid tight housing fixedly secured to said rotatable member and rotatable therewith for retaining the coolant displaced radially outwardly from said rotatable member by centrifugal force, said annular housing having an axially extending rim spaced radially outward from said rotatable and nonrotatable member and side members fixedly secured to said rim and extending radially inwardly therefrom along opposite sides of said rotatable and nonrotatable members, said rotatable and nonrotatable member being submerged in the coolant retained by said annular housing to a predetermined depth depending upon the radial dimension of said side members.

5. A liquid cooled friction brake for use with a member rotatably mounted on a fixed support member comprising a plurality of interleaved rotatable and nonrotatable friction members operatively connected to said rotatable and fixed support members, respectively, and aligned axially in an annular brake cavity; actuating means operatively connected to said nonrotatable friction members for actuating the same into frictional engagement with said rotatable friction members; liquid coolant injecting means operatively connected to said fixed support member and arranged to inject liquid coolant into said brake cavity; and an annular fluid tight housing fixedly secured to said rotatable member and rotatable therewith, said annular housing having an axially extending annular rim spaced radially outwardly from said rotatable and non-rotatable friction members and side members fixedly secured to opposite ends of said rim and extending radially inwardly therefrom along opposite sides of said plurality of interleaved rotatable and nonrotatable members, said rim and side members together defining the outer periphery of said brake cavity, said liquid coolant being injected radially outwardly against said rotatable and nonrotatable friction members during frictional engagement thereof to cool the same, said annular housing collecting and retaining the liquid coolant displaced radially outwardly from said rotatable friction members to form a rotating annular body of liquid coolant which extends radially inwardly over a substantial portion of said rotatable and nonrotatable friction members and which serves to absorb heat generated by frictional engagement thereof.

6. A liquid cooled friction brake for use with a member rotatably mounted on a fixed support member comprising an annular brake carrier member fixedly secured to said fixed support member; a nonrotatable friction member operatively connected to said brake carrier member; a rotatable friction member operatively connected to said rotatable member and rotatable therewith; a fixed annular housing operatively connected to said fixed support member; actuating means carried by said annular housing and operatively connected to said nonrotatable friction member for actuating the same into frictional engagement with said rotatable friction member; and means defining a sealed annular brake cavity enclosing said rotatable and nonrotatable friction members, said last named means including an axially extending tubular member fixedly secured to said rotatable member and disposed radially inwardly from said rotatable and nonrotatable friction members, a sliding fluid seal operatively connected between said annular housing and said tubular member, an axially extending annular rim fixedly secured to said rotatable member and disposed radially outwardly from said rotatable and nonrotatable friction members, a sliding fluid seal operatively connected between said axially extending rim and said annular housing, said rim being provided with key members fixedly secured thereto to which said rotatable friction member is operatively connected, and means fixedly secured to said annular housing through which liquid coolant is introduced to fill said brake cavity, said last named means communicating with said brake cavity at the radially inner portion thereof, said rotatable and nonrotatable friction members being surrounded by said liquid coolant and cooled thereby.

7. A liquid cooled friction brake for use with a member rotatably mounted on a fixed support member comprising a brake carrier member fixedly secured to said fixed support member; a plurality of interleaved rotatable and nonrotatable annular friction members, said nonrotatable friction members being slidably keyed for axial movement to said brake carrier member; actuating means operatively connected to said nonrotatable friction members for actuating the same axially into frictional engagement with said rotatable friction members; means defining a sealed annular brake cavity enclosing said rotatable and nonrotatable friction members, said last named means including a rotatable annular rim portion fixedly secured to said rotatable member and disposed radially outwardly from said rotatable and nonrotatable friction members, a rotatable tubular portion concentric with said rim portion and fixedly secured to said rotating member, said tubular portion being disposed radially inwardly from said rotatable and nonrotatable friction members, a fixed annular side member fixedly secured to said fixed support member, and first and second sliding fluid seals operatively connected between relatively movable surfaces of said side member and said rim portion and tubular portion, respectively; a fixed standpipe fixedly secured to said annular side member; a plurality of openings in said annular side member through which said standpipe communicates with said brake cavity at the radially inner portion thereof; means for venting said standpipe to the atmosphere through which liquid coolant is introduced to fill said brake cavity, said rotatable and nonrotatable friction members being immersed in said liquid coolant which is partially vaporized by the frictional heat generated by said friction members, said liquid coolant being displaced radially outwardly by centrifugal force and retained by said rim portion, said vaporized portion being displaced radially inwardly and discharged through said plurality of openings to said standpipe, said last named means being selectively controlled and operative to vent said vaporized coolant to the atmosphere under certain predetermined conditions of operation.

8. A liquid cooled aircraft disk brake for use with an aircraft wheel rotatably mounted on a fixed axle carried by a retractible landing gear strut comprising a plurality of interleaved annular rotatable and nonrotatable friction disks operatively connected to said wheel and fixed axle, respectively; actuating means operatively connected to said friction disks for actuating the same into frictional engagement; means defining a sealed annular brake cavity enclosing said rotatable and nonrotatable friction disks, said last named means including first and second annular axially extending concentrically arranged members fixedly secured to said wheel and rotatable therewith, said first and second annular members forming the inner and outer peripheries, respectively, of said annular brake cavity, an annular housing fixedly secured to said fixed axle and extending radially outwardly therefrom to form one side of said brake cavity, and first and second sliding fluid seals operatively connected to adjacent cooperating surfaces of said annular housing and said first and second axially extending annular members, means fixedly secured to said annular housing through which said brake cavity is vented to the atmosphere and through which said brake cavity is filled with liquid coolant, valve means operatively connected to said last named means for opening and closing the same, and control means operatively connected to said valve means and said retractible strut for actuating said valve means in response to retractile and protractile movement of said retractible strut, said brake cavity being filled with liquid coolant which surrounds said rotatable and nonrotatable friction members and absorbs the heat generated by frictional engagement thereof, said valve means being operative to vent the vaporized portion of said coolant to the atmosphere.

References Cited in the file of this patent

UNITED STATES PATENTS

| 2,552,571 | Mercier | May 15, 1951 |
| 2,822,997 | Du Bois | Feb. 11, 1958 |
| 2,834,636 | Fawick | May 13, 1958 |

FOREIGN PATENTS

| 1,095,884 | France | Dec. 29, 1954 |

UNITED STATES PATENT OFFICE

CERTIFICATE OF CORRECTION

Patent No. 3,044,736                                  July 17, 1962

Warren D. Chambers

It is hereby certified that error appears in the above numbered patent requiring correction and that the said Letters Patent should read as corrected below.

Column 5, line 39, strike out "175"; column 8, line 10, for "256b" read -- 156b --.

Signed and sealed this 18th day of December 1962.

(SEAL)
Attest:

ERNEST W. SWIDER                                          DAVID L. LADD
Attesting Officer                                             Commissioner of Patents